United States Patent
Park et al.

(10) Patent No.: US 12,248,633 B2
(45) Date of Patent: Mar. 11, 2025

(54) METHOD FOR PROVIDING VIBRATION AND WEARABLE ELECTRONIC DEVICE SUPPORTING THE SAME

(71) Applicant: SAMSUNG ELECTRONICS CO., LTD., Suwon-si (KR)

(72) Inventors: Jaeha Park, Suwon-si (KR); Changtaek Kang, Suwon-si (KR); Jonghwan Kim, Suwon-si (KR); Seongkwan Yang, Suwon-si (KR); Hochul Hwang, Suwon-si (KR); Kyoungho Bang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/372,338

(22) Filed: Sep. 25, 2023

(65) Prior Publication Data
US 2024/0126371 A1    Apr. 18, 2024

Related U.S. Application Data

(63) Continuation of application No. PCT/KR2023/013454, filed on Sep. 7, 2023.

(30) Foreign Application Priority Data

Oct. 17, 2022  (KR) .................. 10-2022-0133012
Nov. 24, 2022  (KR) .................. 10-2022-0159668

(51) Int. Cl.
    *G06F 3/01*    (2006.01)
    *G06F 3/16*    (2006.01)

(52) U.S. Cl.
    CPC .............. *G06F 3/016* (2013.01); *G06F 3/165* (2013.01)

(58) Field of Classification Search
    CPC .......... G06F 3/016; G06F 3/165; G06F 3/167; G06F 3/011
    See application file for complete search history.

(56) References Cited

U.S. PATENT DOCUMENTS

| | | | |
|---|---|---|---|
| 10,754,428 | B1 | 8/2020 | Parise et al. |
| 10,966,007 | B1 | 3/2021 | Fenner et al. |
| (Continued) | | | |

FOREIGN PATENT DOCUMENTS

| | | | |
|---|---|---|---|
| JP | 2000-210468 A | 8/2000 | |
| JP | 2018-140176 A | 9/2018 | |
| (Continued) | | | |

OTHER PUBLICATIONS

International Search Report dated Dec. 4, 2023, issued by the International Searching Authority in International Application No. PCT/KR2023/013454 (PCT/ISA/210).

(Continued)

*Primary Examiner* — Premal R Patel
(74) *Attorney, Agent, or Firm* — Sughrue Mion, PLLC

(57) ABSTRACT

A wearable electronic device according to an embodiment may comprise a plurality of speakers, a plurality of vibration devices, and at least one processor. The at least one processor may be configured to identify a first object corresponding to a first sound and a position of the first object in a virtual space of VR content displayed through the display. The at least one processor may be configured to obtain a second sound corresponding to the movement of the first object based on the first sound and the position of the first object. The at least one processor may be configured to output the second sound through the plurality of speakers. The at least one processor may be configured to determine one or more vibration devices corresponding to the movement of the first object among the plurality of vibration devices. The at least one processor may be configured to (Continued)

control the one or more vibration devices to vibrate while the second sound is output through the plurality of speakers.

20 Claims, 13 Drawing Sheets

(56) References Cited

U.S. PATENT DOCUMENTS

| | | |
|---|---|---|
| 2007/0196801 A1 | 8/2007 | Nagasaka et al. |
| 2012/0050324 A1 | 3/2012 | Jeong et al. |
| 2015/0323993 A1* | 11/2015 | Levesque ............... G06F 3/017 |
| | | 345/156 |
| 2017/0185148 A1 | 6/2017 | Kondo |
| 2018/0284894 A1 | 10/2018 | Raut et al. |
| 2020/0112815 A1 | 4/2020 | Audfray et al. |
| 2020/0249762 A1 | 8/2020 | Keller et al. |
| 2021/0081047 A1 | 3/2021 | Wang et al. |
| 2021/0176548 A1 | 6/2021 | Fenner et al. |
| 2021/0303258 A1 | 9/2021 | Tanaka |
| 2022/0062766 A1* | 3/2022 | Dom ...................... H04S 7/304 |
| 2022/0226731 A1 | 7/2022 | Dorn et al. |
| 2024/0089327 A1* | 3/2024 | Patel .................... H04L 65/403 |
| 2024/0098447 A1* | 3/2024 | Messingher Lang .... H04R 1/10 |

FOREIGN PATENT DOCUMENTS

| | | |
|---|---|---|
| JP | 2018-202025 A | 12/2018 |
| KR | 10-1381396 B1 | 4/2014 |
| KR | 10-1588409 B1 | 1/2016 |
| KR | 10-1685983 B1 | 12/2016 |

OTHER PUBLICATIONS

Written Opinion dated Dec. 4, 2023, issued by the International Searching Authority in International Application No. PCT/KR2023/013454 (PCT/ISA/237).

* cited by examiner

METHOD FOR PROVIDING VIBRATION AND WEARABLE ELECTRONIC DEVICE SUPPORTING THE SAME

CROSS-REFERENCE TO RELATED APPLICATIONS

This application is a by-pass continuation of International Application No. PCT/KR2023/013454, filed on Sep. 7, 2023, which is based on and claims priority to Korean Patent Application No. 10-2022-0133012, filed on Oct. 17, 2022, in the Korean Intellectual Property Office, and Korean Patent Application No. 10-2022-0159668, filed on Nov. 24, 2022, in the Korean Intellectual Property Office, the disclosures of which are incorporated by reference herein in their entireties.

BACKGROUND

1. Field

The disclosure relates to a method for providing a vibration and a wearable electronic device supporting the same.

2. Description of Related Art

An increasing number of services and additional features are being offered through wearable electronic devices such as augmented reality glasses (AR glasses), virtual reality glasses (VR glasses), and head mounted display (HMD) devices. To meet the needs of various users and raise use efficiency of electronic devices, communication service carriers or device manufacturers are jumping into competitions to develop electronic devices with differentiated and diversified functionalities. Accordingly, various functions that are provided through wearable electronic devices are evolving more and more.

A wearable electronic device may provide a vibration while providing content. For example, if an event occurs in the virtual space of VR content while the wearable electronic device is providing the VR content, the wearable electronic device may output a vibration having a pattern pre-programmed for the event through a controller wirelessly (or wiredly) connected with the wearable electronic device.

SUMMARY

When an event occurs while content is provided, the wearable electronic device may output a vibration having a pattern pre-programmed for the event but may not provide a vibration for events for which no vibration pattern has been pre-programmed (e.g., not pre-programmed when the content is created). The wearable electronic device may be required to provide a vibration even for events for which no vibration pattern is pre-programmed to provide a better immersive experience for content to the user.

When a sound is generated while the wearable electronic device provides content, the user of the wearable electronic device (e.g., the user wearing the wearable electronic device) may not perceive the position (and direction) of the sound only with the sound.

The disclosure relates to a method of providing a vibration and a wearable electronic device supporting the same, which may provide the user with an immersive experience by providing a vibration related to an event when the event occurs in the content provided by the wearable electronic device.

A wearable electronic device according to an embodiment may comprise a plurality of speakers, a plurality of vibration devices configured to provide vibration, and at least one processor. The at least one processor may be configured to identify a first object corresponding to a first sound and a position of the first object in a virtual space of VR (virtual reality) content displayed through the display. The at least one processor may be configured to obtain a second sound corresponding to a movement of the first object, based on the first sound and the position of the first object. The at least one processor may be configured to output the second sound through the plurality of speakers. The at least one processor may be configured to determine one or more vibration devices corresponding to the movement of the first object among the plurality of vibration devices. The at least one processor may be configured to control the one or more vibration devices to vibrate while the second sound is output through the plurality of speakers.

A method for providing a vibration in a wearable electronic device according to an embodiment may comprise identifying a first object corresponding to a first sound and a position of the first object in a virtual space of VR (virtual reality) content displayed through a display of the wearable electronic device. The method may comprise obtaining a second sound corresponding to a movement of the first object, based on the first sound and the position of the first object. The method may comprise outputting the second sound through a plurality of speakers of the wearable electronic device. The method may comprise determining one or more vibration devices corresponding to the movement of the first object from among a plurality of vibration devices included in a vibration module of the wearable electronic device. The method may comprise controlling the one or more vibration devices to vibrate while the second sound is output through the plurality of speakers.

In an embodiment, in a non-transitory computer-readable medium storing computer-executable instructions, the computer-executable instructions may, when executed, enable a wearable electronic device including at least one processor to identify a first object corresponding to a first sound and a position of the first object in a virtual space of VR content displayed through the display. The computer-executable instructions may, when executed, enable the wearable electronic device including the at least one processor to, obtain a second sound corresponding to the movement of the first object, based on the first sound and the position of the first object. The computer-executable instructions may, when executed, enable the wearable electronic device including the at least one processor to output the second sound through the plurality of speakers. The computer-executable instructions may, when executed, enable the wearable electronic device including the at least one processor to determine one or more vibration devices corresponding to the movement of the first object among the plurality of vibration devices. The computer-executable instructions may, when executed, enable the wearable electronic device including the at least one processor to control the one or more vibration devices to vibrate while the second sound is output through the plurality of speakers.

A wearable electronic device according to an embodiment may comprise a plurality of vibration devices and at least one processor operatively connected with the plurality of vibration devices. The at least one processor may be configured to identify a first object and a position of the first object present in a real space and corresponding to a sound. The at least one processor may be configured to determine one or more vibration devices corresponding to the movement of the first object among the plurality of vibration devices. The at least one processor may be configured to control the one or more vibration devices to vibrate.

A method providing a vibration and a wearable electronic device supporting the same, according to an embodiment, may provide a vibration for an event for which no vibration pattern is pre-programmed, providing a better immersive experience for content to the user.

A method providing a vibration and a wearable electronic device supporting the same, according to an embodiment, may provide a vibration to allow the user to perceive the position (and direction) of a sound when the sound is generated while providing content, thus enhancing the user's immersion.

Aspects of the disclosure are not limited to the foregoing, and other unmentioned aspects will be apparent to one of ordinary skill in the art from the following description.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
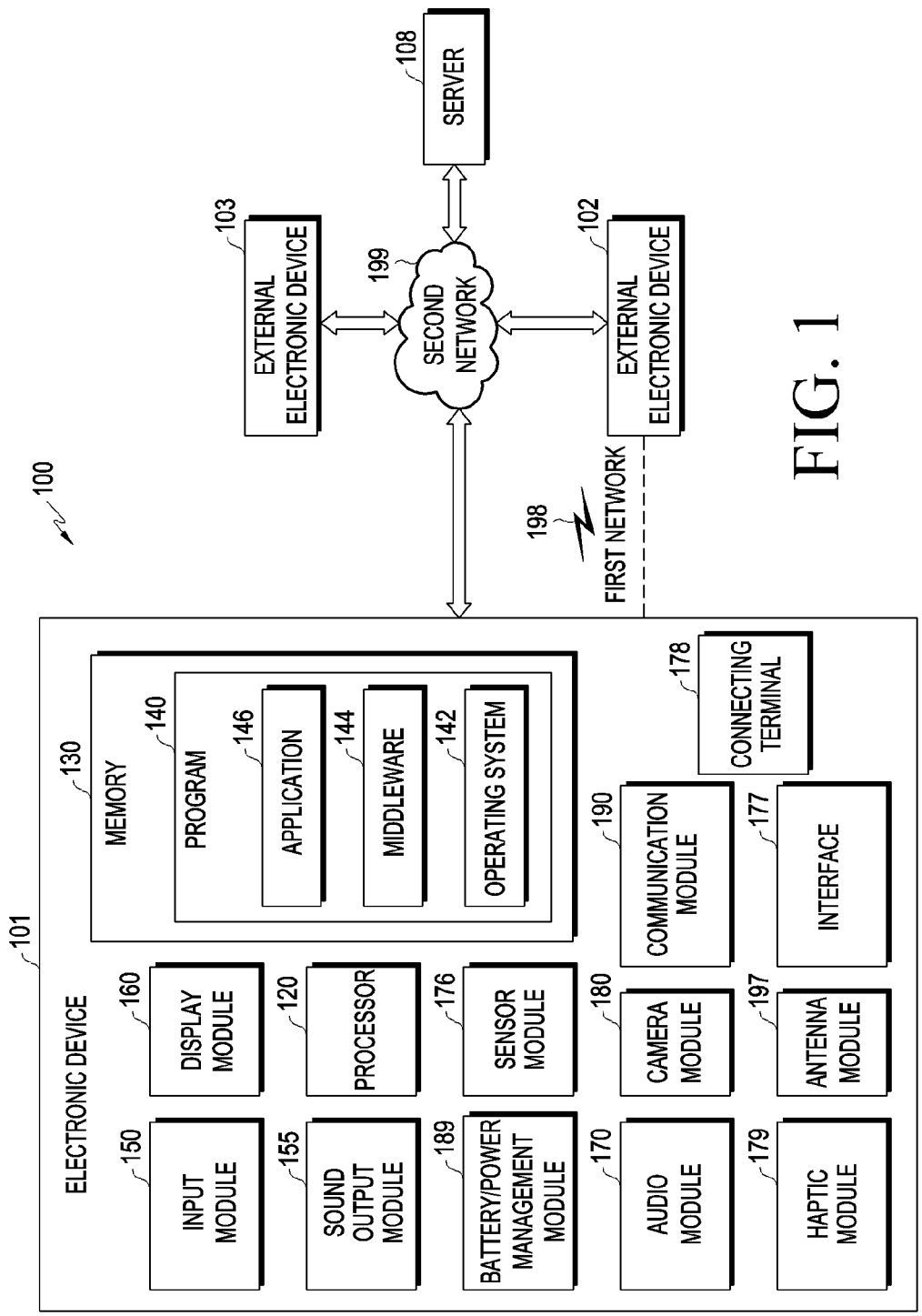
FIG. 1 is a block diagram illustrating an electronic device according to an embodiment.

FIG. 1 is a block diagram 100 illustrating an electronic device 101 according to an embodiment.

The electronic device 101 may be, e.g., a wearable electronic device worn on the user's head, such as AR glasses, VR glasses, and/or an HMD device. The electronic device 101 may also be referred to as a wearable electronic device.

The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. For example, the external electronic device 102 may render and transfer, to the electronic device 101, content data executed on an application, and the electronic device 101 receiving the data may output the content data to a display module. If the electronic device 101 detects the user's motion through, e.g., an inertial measurement unit (IMU) sensor, the processor 120 of the electronic device 101 may correct the rendering data received from the external electronic device 102 based on the motion information and output it to the display module 160. Alternatively, the electronic device 101 may transfer the motion information to the external electronic device 102 and request rendering so that screen data is updated accordingly. According to various embodiments, the external electronic device 102 may be various types of devices, such as a smart phone or a case device capable of storing and charging the electronic device 101.

According to an embodiment, the electronic device 101 may communicate with an electronic device 102 via a first network 198 (e.g., a short-range wireless communication network), and/or an electronic device 103 or a server 108 via a second network 199 (e.g., a long-range wireless communication network). According to an embodiment, the electronic device 101 may communicate with another electronic device via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module and/or a battery 189, a communication module 190, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

According to an embodiment, the processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or communication module 190) onto a volatile memory, process the command or the data stored in the volatile memory, and store resulting data in a non-volatile memory. According to an embodiment, the processor 120 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor and the auxiliary processor, the auxiliary processor may be configured to use lower power than the main processor or to be specified for a designated function. The auxiliary processor may be implemented separately from, or as part of, the main processor. The auxiliary processor may control at least some of functions or states related to at least one component (e.g., display module 160, sensor module 176, or communication module 190) of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another component (e.g., the camera module 180 or the communication module 190) functionally related to the auxiliary processor 123. According to an embodiment, the auxiliary processor (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

According to an embodiment, the memory 130 may store various data used by at least one component (e.g., the processor 120 or a sensor module 176) of the electronic device 101. The various data may include, for example, software (e.g., the program 140) and input data or output data for a command related thereto. The memory 130 may include a volatile memory or a non-volatile memory.

According to an embodiment, the program 140 may be stored in the memory 130 as software, and may include, for example, an operating system (OS) 142, middleware 144, or an application 146.

According to an embodiment, the input module 150 may receive a command or data to be used by other component (e.g., the processor 120) of the electronic device 101, from the outside (e.g., a user) of the electronic device 101. The input module 150 may include, but is not limited to, a microphone, a button, and/or a touch pad.

According to an embodiment, the sound output module 155 may output sound signals to the outside of the electronic device 101. The sound output module 155 may include, e.g., a speaker. The speaker may be used for general purposes, such as playing multimedia or playing record.

According to an embodiment, the display module 160 may visually provide information to the outside (e.g., the user) of the electronic device 101. For example, when the electronic device 101 is implemented as AR glasses, the display module 160 may include, but is not limited thereto, e.g., a liquid crystal display (LCD), a digital mirror device (DMD), a liquid crystal on silicon (LCoS), light emitting diode (LED) on silicon (LEDoS), organic light emitting diode (OLED), or micro light emitting diode (micro LED). The display module 160 may have different implementation forms depending on the type of electronic device 101.

According to an embodiment, the audio module 170 may convert a sound into an electrical signal and vice versa. According to an embodiment, the audio module 170 may obtain the sound via the input module 150, or output the sound via the sound output module 155 or a headphone of an external electronic device (e.g., external electronic device 102) directly (e.g., wiredly) or wirelessly coupled with the electronic device 101. The external electronic device 102 may be, e.g., a mobile device, such as a smart phone or tablet PC, but is not limited thereto.

According to an embodiment, the sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, and/or an illuminance sensor.

According to an embodiment, the interface 177 may support one or more specified protocols to be used for the electronic device 101 to be coupled with the external electronic device (e.g., external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

According to an embodiment, the connecting terminal 178 may include a connector via which the electronic device 101 may be physically connected with the external electronic device (e.g., external electronic device 102). According to an embodiment, the connecting terminal 178 may include, for example, a HDMI connector, a USB connector, a SD card connector, or an audio connector (e.g., a headphone connector).

According to an embodiment, the haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

According to an embodiment, the camera module 180 may capture a still image and a video. According to an embodiment, the camera module 180 may include one or more lenses, image sensors, image signal processors, or flashes.

According to an embodiment, the power management module and/or battery 189 may manage power supplied to the first external electronic device 101. According to an embodiment, the power management module and/or battery 189 may be implemented as at least part of, for example, a power management integrated circuit (PMIC). The power management module and/or the battery 189 may supply power to at least one component of the electronic device 101. According to an embodiment, the power supply module and/or battery 189 may include, for example, a primary cell which is not rechargeable, a secondary cell which is rechargeable, or a fuel cell.

According to an embodiment, the communication module 190 may support establishing a direct (e.g., wired) communication channel or a wireless communication channel between the electronic device 101 and the external electronic device (e.g., external electronic device 102, external electronic device 103, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device 102 or 103 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module may identify or authenticate the electronic device 101 in a communication network, such as the first network 198 or the second network 199, using subscriber information (e.g., international mobile subscriber identity (IMSI)) stored in the subscriber identification module.

The wireless communication module may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., the mmWave band) to achieve, e.g., a high data transmission rate. The wireless communication module may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module may support various requirements specified in the electronic device 101, an external electronic device (e.g., the electronic device 103), or a network system (e.g., the second network 199). According to an embodiment, the wireless communication module may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. As described above, when the electronic device 101 supports cellular communication, such as 4G and 5G, the electronic device 101 may be referred to as a standalone (SA) type electronic device. Meanwhile, the electronic device 101 may be implemented not to support cellular communication, such as 4G and 5G. In this case, the electronic device 101 may use the Internet via the external electronic device 102 supporting cellular communication using the first network 198 in which case the electronic device 101 may be referred to as a non-standalone type electronic device.

According to an embodiment, the antenna module 197 may transmit or receive a signal or power to or from the outside (e.g., the external electronic device). According to an embodiment, the antenna module 197 may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 103 via the server 108 coupled with the second network 199. The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 103 may include an Internet-of-things (IoT) device. The server 108 may be an intelligent server using machine learning and/or a neural network. According to an embodiment, the external electronic device 103 or the server 108 may be included in the second network 199. The electronic device 101 may be applied to intelligent services (e.g., smart home, smart city, smart car, or healthcare) based on 5G communication technology or IoT-related technology.

Figure 2:
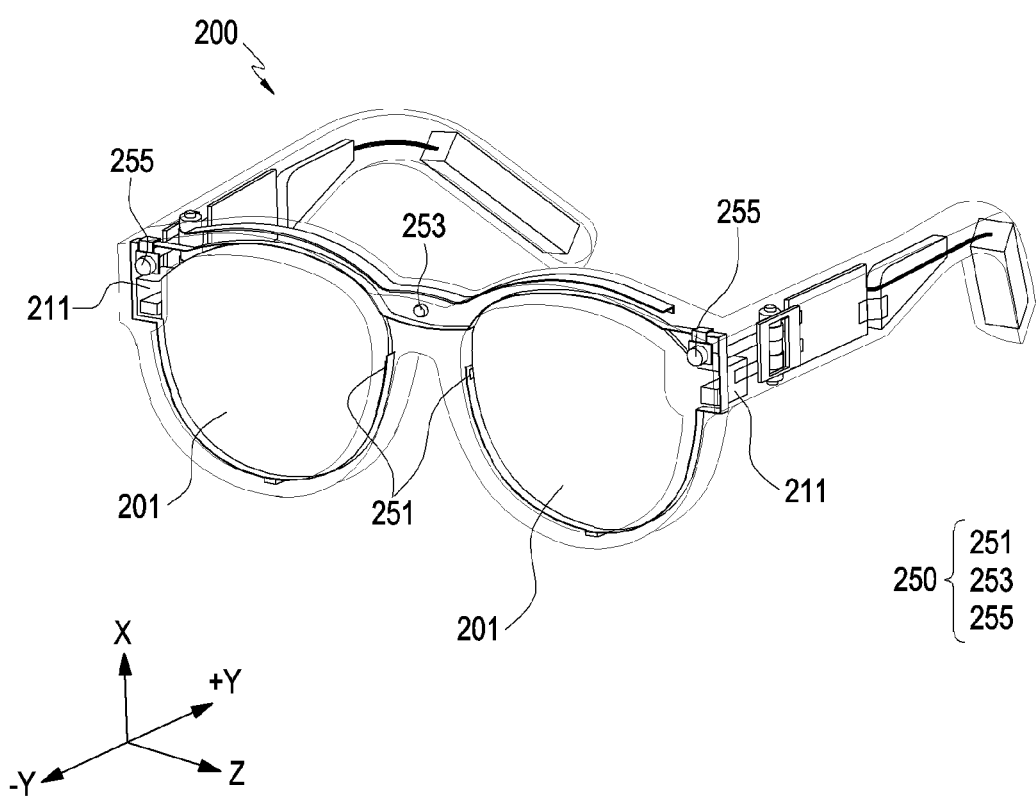
FIG. 2 is a perspective view illustrating an internal configuration of a wearable electronic device according to an embodiment of the disclosure.

FIG. 2 is a perspective view illustrating an internal configuration of a wearable electronic device 200 according to an embodiment of the disclosure.

Referring to FIG. 2, according to an embodiment of the disclosure, a wearable electronic device 200 may include at least one of a light output module 211, a display member 201, and a camera module 250.

According to an embodiment of the disclosure, the light output module 211 may include a light source capable of outputting an image and a lens guiding the image to the display member 201. According to an embodiment of the disclosure, the light output module 211 may include at least one of a liquid crystal display (LCD), a digital mirror device (DMD), a liquid crystal on silicon (LCoS), a light emitting diode (LED on silicon (LEDoS), an organic light emitting diode (OLED), or a micro light emitting diode (micro LED).

According to an embodiment of the disclosure, the display member 201 may include an optical waveguide (e.g., a waveguide). According to an embodiment of the disclosure, the image output from the light output module 211 incident on one end of the optical waveguide may propagate inside the optical waveguide and be provided to the user. According to an embodiment of the disclosure, the optical waveguide may include at least one of at least one diffractive element (e.g., a diffractive optical element (DOE) or a holographic optical element (HOE)) or a reflective element (e.g., a reflective mirror). For example, the optical waveguide may guide the image output from the light output module 211 to the user's eyes using at least one diffractive element or reflective element.

According to an embodiment of the disclosure, the camera module 250 may capture still images and/or moving images. According to an embodiment, the camera module 250 may be disposed in a lens frame and may be disposed around the display member 201.

According to an embodiment of the disclosure, a first camera module 251 may capture and/or recognize the trajectory of the user's eye (e.g., pupil or iris) or gaze. According to an embodiment of the disclosure, the first camera module 251 may periodically or aperiodically transmit information related to the trajectory of the user's eye or gaze (e.g., trajectory information) to a processor (e.g., the processor 120 of FIG. 1).

According to an embodiment of the disclosure, a second camera module 253 may capture an external image.

According to an embodiment of the disclosure, a third camera module 255 may be used for hand detection and tracking, and recognition of the user's gesture (e.g., hand motion). According to an embodiment of the disclosure, the third camera module 255 may be used for 3 degrees of freedom (3DoF) or 6DoF head tracking, location (space, environment) recognition and/or movement recognition. The second camera module 253 may also be used for hand detection and tracking and recognition of the user's gesture. According to an embodiment of the disclosure, at least one of the first camera module 251 to the third camera module 255 may be replaced with a sensor module (e.g., a LiDAR sensor). For example, the sensor module may include at least one of a vertical cavity surface emitting laser (VCSEL), an infrared sensor, and/or a photodiode.

Figure 3A:
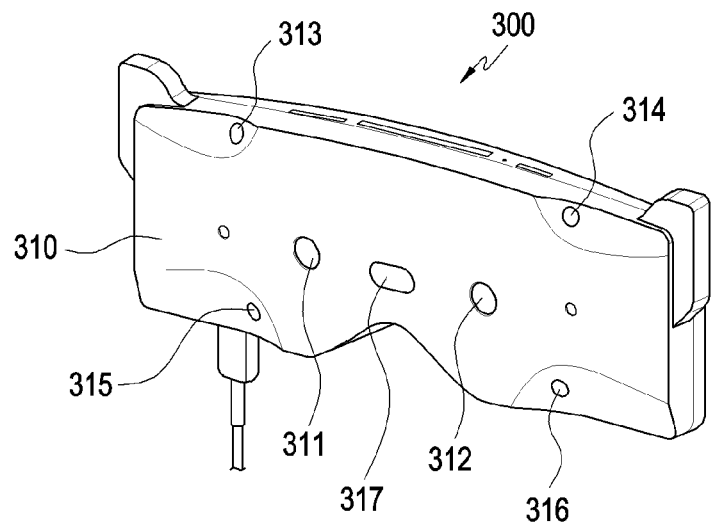
FIG. 3A is a front view illustrating a wearable electronic device according to an embodiment.

FIG. 3A is a front view illustrating a wearable electronic device 300 according to an embodiment.

Figure 3B:
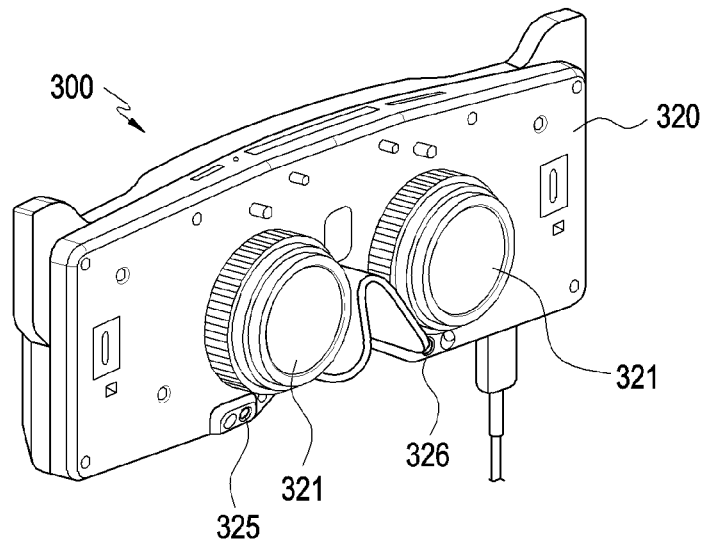
FIG. 3B is a rear view illustrating a wearable electronic device according to an embodiment.

FIG. 3B is a rear view illustrating a wearable electronic device 300 according to an embodiment.

Referring to FIGS. 3A and 3B, in an embodiment, camera modules 311, 312, 313, 314, 315, and 316 and/or a depth sensor 317 for obtaining information related to the ambient environment of the wearable electronic device 300 may be disposed on the first surface 310 of the housing.

In an embodiment, the camera modules 311 and 312 may obtain images related to the ambient environment of the wearable electronic device.

In an embodiment, the camera modules 313, 314, 315, and 316 may obtain images while the wearable electronic device is worn by the user. The camera modules 313, 314, 315, and 316 may be used for hand detection, tracking, and recognition of the user's gestures (e.g., hand motions). The camera modules 313, 314, 315, and 316 may be used for 3DoF or 6DoF head tracking, location (space or environment) recognition, and/or movement recognition. In an embodiment, the camera modules 311 and 312 may be used for hand detection and tracking and recognition of the user's gesture.

In an embodiment, the depth sensor 317 may be configured to transmit a signal and receive a signal reflected from an object and be used for identifying the distance to the object, such as time of flight (TOF). For example, alternatively or additionally to the depth sensor 217, the camera modules 313, 314, 315, and 316 may identify the distance to the object.

According to an embodiment, camera modules 325 and 326 for face recognition and/or a display (and/or lens) 321 may be disposed on the second surface 320 of the housing.

In an embodiment, the face recognition camera modules 325 and 326 adjacent to the display may be used for recognizing the user's face or may recognize and/or track both eyes of the user.

In an embodiment, the display (and/or lens) 321 may be disposed on the second surface 320 of the wearable electronic device 300. In an embodiment, the wearable electronic device 300 may not include the camera modules 315 and 316 among the plurality of camera modules 313, 314, 315, and 316. The wearable electronic device 300 may further include at least one of the components shown in FIG. 2.

As described above, according to an embodiment, the wearable electronic device 300 may have a form factor to be worn on the user's head. The wearable electronic device 300 may further include a strap and/or a wearing member to be fixed on the user's body part. The wearable electronic device 300 may provide the user experience based on augmented reality, virtual reality, and/or mixed reality while worn on the user's head.

Figure 4:
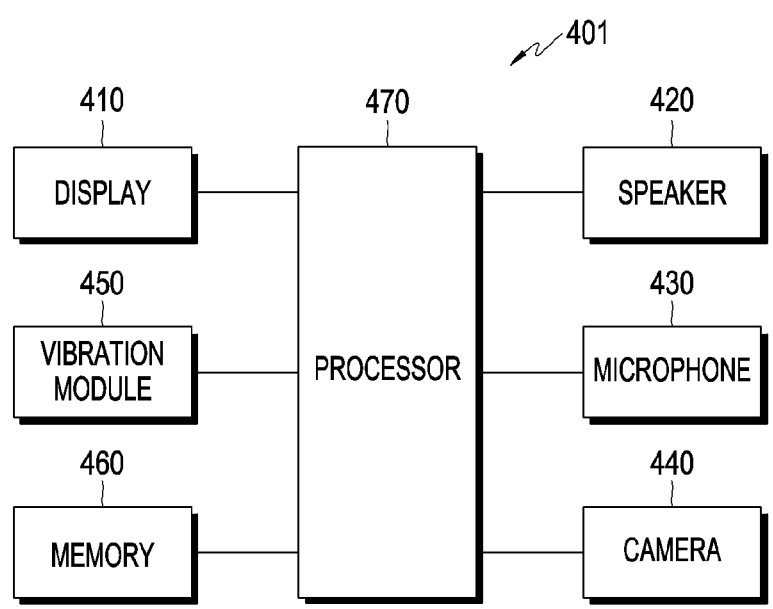
FIG. 4 is a block diagram illustrating an electronic device according to an embodiment.

FIG. 4 is a block diagram illustrating an electronic device 401 according to an embodiment.

Referring to FIG. 4, in an embodiment, an electronic device 401 may include a display 410, a speaker 420, a microphone 430, a camera 440, a vibration module 450, a memory 460, and/or a processor 470.

In an embodiment, the display 410 may be the display module 160 of FIG. 1, the light output module 211 of FIG. 2, and/or the display 321 of FIGS. 3A and 3B.

In an embodiment, the speaker 420 may be the sound output module 155 of FIG. 1.

In an embodiment, the speaker 420 may include a plurality of speakers. For example, the speaker 420 may include a first speaker (hereinafter, referred to as a "first speaker") (e.g., a speaker disposed at a position adjacent to the user's left ear when worn by the user) for providing sound to the user's left ear and a second speaker (hereinafter, referred to as a "second speaker") (e.g., a speaker disposed at a position adjacent to the user's right ear when worn by the user) for providing sound to the user's right ear while the electronic device 401 is worn by the user. However, without limitations thereto, the speaker 420 may further include at least one speaker in addition to the first speaker and the second speaker.

In an embodiment, the microphone 430 may be included in the input module 150 of FIG. 1

In an embodiment, the camera 440 may be at least one of the camera module 180 of FIG. 1, the camera module 250 of FIG. 2, and/or the camera modules 311, 312, 313, 314, 315, and 316 of FIG. 3.

In an embodiment, the vibration module 450 (also referred to as a "haptic module") may output vibration.

In an embodiment, the vibration module 450 may include a plurality of vibration devices. For example, when the movement of the object is detected in the virtual space of the VR content while the electronic device 401 provides the VR content, the vibration module 450 may include a plurality of vibration devices for providing vibration corresponding to the movement of the object. For example, when a sound is generated in the virtual space of the VR content while the electronic device 401 provides the VR content, the vibration module 450 may include a plurality of vibration devices for providing a vibration indicating the position (and direction) where the sound is generated. Hereinafter, the plurality of vibration devices included in the vibration module 450 are described in more detail with reference to FIG. 5.

Figure 5:
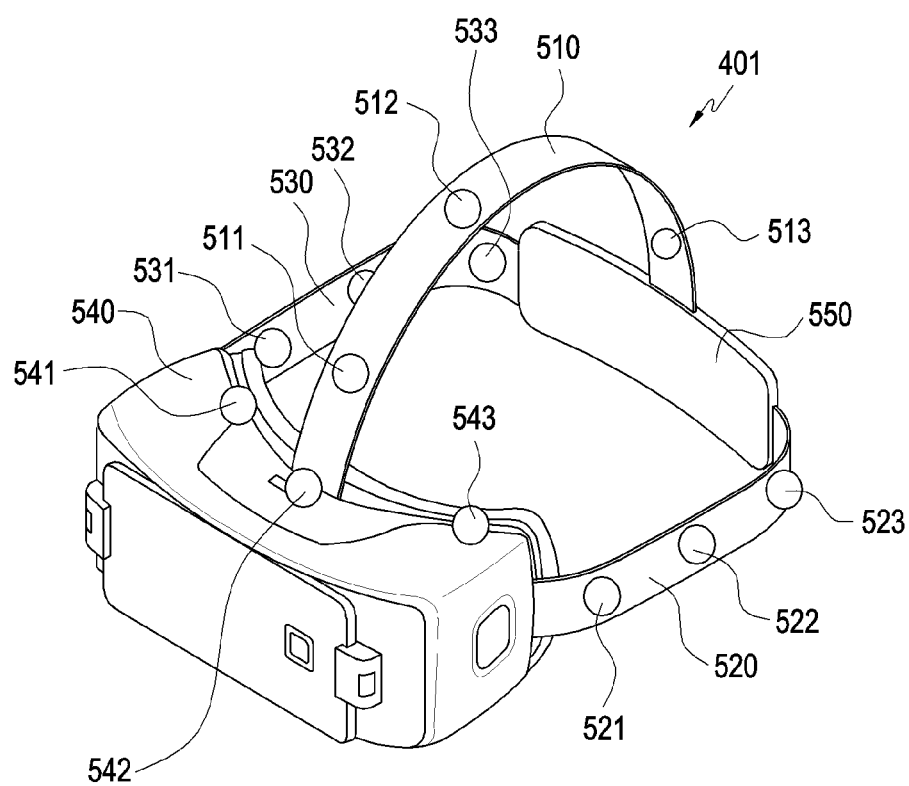
FIG. 5 is a view illustrating a plurality of vibration devices included in a vibration module according to an embodiment.

FIG. 5 is a view illustrating a plurality of vibration devices included in a vibration module 450 according to an embodiment.

Referring to FIG. 5, in an embodiment, a plurality of vibration devices (also referred to herein as vibrators) 511, 512, 513, 521, 522, 523, 531, 532, 533, 541, 542, and 543 may be disposed on a wearing member (e.g., the first wearing member 510, the second wearing member 520, the third wearing member 530) and the front portion 540.

In an embodiment, the plurality of vibration devices 511, 512, 513, 521, 522, 523, 531, 532, 533, 541, 542, and 543 may be disposed at positions of the electronic device 401, where a vibration corresponding to the movement of an object (and contact between objects) and/or movement of a sound (and the position where the sound is generated) may be output in the content (e.g., VR content) provided by the electronic device 401.

In an embodiment, the vibration device 511, the vibration device 512, and the vibration device 513 may be disposed at regular intervals on the first wearing member 510. For example, when the electronic device 401 is worn on the user's head, the vibration device 511 may be disposed at a position adjacent to the position between the front end and the upper end of the head, the vibration device 512 may be disposed at a position adjacent to the position of the upper end of the head, and the vibration device 513 may be disposed at a position adjacent to the position between the upper end and the rear end of the head.

In an embodiment, the vibration device 521, the vibration device 522, and the vibration device 523 may be disposed at regular intervals on the second wearing member 520. For example, when the electronic device 401 is worn on the user's head, the vibration device 521 may be disposed at a position adjacent to the position between the front end and the left end of the head, the vibration device 522 may be disposed at a position adjacent to the position of the left end of the head, and the vibration device 523 may be disposed at a position adjacent to the position between the left end and the rear end of the head.

In an embodiment, the vibration device 531, the vibration device 532, and the vibration device 533 may be disposed at regular intervals on the third wearing member 530. For example, when the electronic device 401 is worn on the user's head, the vibration device 531 may be disposed at a position adjacent to the position between the front end and the right end of the head, the vibration device 532 may be disposed at a position adjacent to the position of the right end of the head, and the vibration device 533 may be disposed at a position adjacent to the position between the right end and the rear end of the head.

In an embodiment, the vibration device 541, the vibration device 542, and the vibration device 543 may be disposed at regular intervals on the front portion 540. For example, the vibration device 542 may be disposed at a middle position of the front portion 540, the vibration device 541 may be disposed at a right position of the front portion 540, and the vibration device 543 may be disposed at a left position of the front portion 540.

In an embodiment, one or more additional vibration devices may be disposed on the rear portion 550.

FIG. 5 illustrates an example in which the vibration module 450 includes 12 vibration devices 511, 512, 513, 521, 522, 523, 531, 532, 533, 541, 542, and 543, but is not limited thereto. For example, the vibration module 450 may include a plurality of vibration devices exceeding 12 or less than 12.

FIG. 5 illustrates an example in which the wearing member is in the form of a band, but is not limited thereto, and the wearing member may be implemented in various forms. FIG. 5 illustrates an example in which a plurality of vibration devices are disposed on a wearing member, but the disclosure is not limited thereto. For example, when the electronic device 401 includes a mask-type or glove-type configuration, a plurality of additional vibration devices may be disposed in the mask-type or glove-type configuration.

Referring back to FIG. 4, in an embodiment, the memory 460 may be the memory 130 of FIG. 1.

In an embodiment, the memory 460 may store information for performing the operation of providing vibration. The information stored in the memory 460 is described below.

In an embodiment, the processor 470 may be the processor 120 of FIG. 1.

In an embodiment, the processor 470 may control the overall operation of providing vibration. In an embodiment, the processor 470 may include one or more processors for performing the operation of providing vibration. The operation of providing vibration by the processor 470 is described below with reference to FIG. 6.

In an embodiment, the electronic device 401 may be AR glasses such as the wearable electronic device 200 of FIG. 2 or VR glasses such as the wearable electronic device 300 of FIGS. 3A and 3B.

Although FIG. 4 illustrates an example in which the electronic device 401 includes a display 410, a speaker 420, a microphone 430, a camera 440, a vibration module 450, a memory 460, and/or a processor 470, the disclosure is not limited thereto. For example, the electronic device 401 may further include at least one of the components illustrated in FIG. 1 (e.g., the communication module 190). Further, the electronic device 401 may not include some of the components illustrated in FIG. 4, depending on whether the electronic device 401 is AR glasses or VR glasses.

The wearable electronic device 401 according to an embodiment may include a plurality of speakers (e.g., the speaker 420), a vibration module 450 including a plurality of vibration devices, a display 410, and at least one processor 470. The at least one processor 470 may be configured to identify a first object corresponding to a first sound and a position of the first object in a virtual space of VR content displayed through the display 410. The at least one processor 470 may be configured to obtain a second sound corresponding to a movement of the first object, based on the first sound and the position of the first object. The at least one processor 470 may be configured to output the second sound through the plurality of speakers. The at least one processor 470 may be configured to determine one or more vibration devices corresponding to the movement of the first object among the plurality of vibration devices. The at least one processor 470 may be configured to control the vibration module 450 such that the one or more vibration devices vibrate while the second sound is output.

In an embodiment, the first sound may be a sound source pre-programmed to be output when an event related to the first object occurs in the VR content, and the second sound may be obtained by performing sound rendering on the first sound.

In an embodiment, the at least one processor 470 may be configured to obtain a distance between an avatar and the first object based on the position of the avatar and the position of the first object, obtain a direction from the position of the avatar to the position of the first object, as a direction between the avatar and the first object, based on a direction in which the avatar faces, and obtain the second sound by rendering the first sound based on the distance and direction between the avatar and the first object.

In an embodiment, the at least one processor 470 may be configured to determine the one or more vibration devices to output vibration among the plurality of vibration devices, based on the distance and the direction between the avatar and the first object.

In an embodiment, the at least one processor 470 may be configured to determine the respective vibration magnitudes of the one or more vibration devices, based on the distance and the direction between the avatar and the first object.

In an embodiment, the at least one processor 470 may be further configured to detect contact between the avatar and the first object, based on the first object and the position of the first object, and determine one or more vibration devices corresponding to the contact between the avatar and the first object among the plurality of vibration devices.

In an embodiment, the at least one processor 470 may be configured to determine the one or more vibration devices to output vibration among the plurality of vibration devices, based on the direction between the avatar and the first object when the avatar and the first object contact each other.

In an embodiment, the at least one processor 470 may be configured to determine vibration magnitudes of the one or more vibration devices, based on the speed of the first object, the type of the first object, the size of the first object, and/or the contact area between the avatar and the first object when the avatar and the first object contact each other.

In an embodiment, the at least one processor 470 may be configured to identify a direction between the avatar and the first object and determine the one or more vibration devices to output a vibration corresponding to the identified direction among the plurality of vibration devices.

According to an embodiment, the wearable electronic device 401 may include a vibration module 450 including a plurality of vibration devices and at least one processor 470 operatively connected to the vibration module 450. The at least one processor 470 may be configured to identify a first object and a position of the first object present in a real space and corresponding to a sound. The at least one processor 470 may be configured to determine one or more vibration devices corresponding to a movement of the first object among the plurality of vibration devices. The at least one processor 470 may be configured to control the vibration module 450 such that the one or more vibration devices vibrate.

In an embodiment, the wearable electronic device 401 may further include a microphone 430 and a camera 440, and the at least one processor 470 may be configured to identify the first object and the position of the first object, based on the sound obtained through the microphone 430 and the image obtained through the camera 440.

Figure 6:
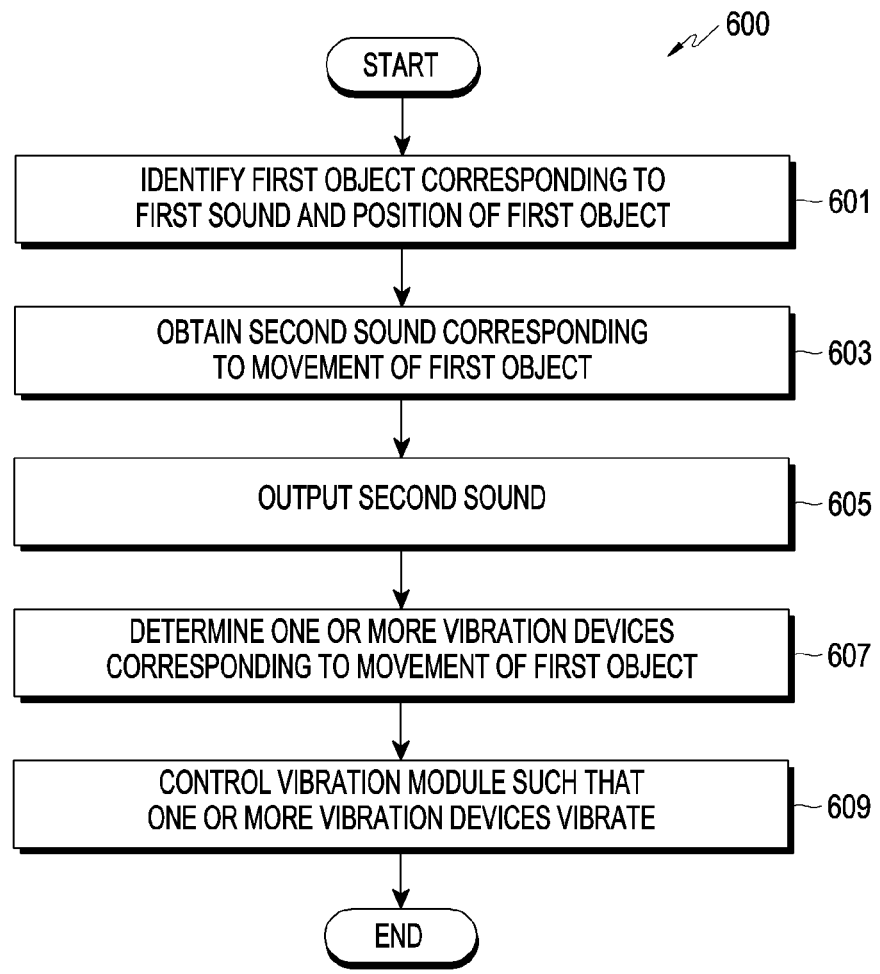
FIG. 6 is a flowchart illustrating a method for providing a vibration according to an embodiment.

FIG. 6 is a flowchart 600 illustrating a method for providing vibration according to an embodiment.

In an embodiment, FIG. 6 may be a view illustrating a method performed to provide vibration (and sound) while content (e.g., VR content) is provided in the electronic device 401 (e.g., VR glasses).

Referring to FIG. 6, in operation 601, in an embodiment, the processor 470 may identify the first object corresponding to the first sound and the position of the first object in the virtual space of the VR content.

In an embodiment, the VR content may include content capable of representing a scene viewed from the viewpoint of an avatar (or character) corresponding to the user (hereinafter, the avatar corresponding to the user is referred to as an "avatar corresponding to the user" or an "avatar") in the virtual space. For example, the VR content may include content capable of representing a scene of a first-person view corresponding to a direction (or a user's gaze) in which the electronic device 401 faces. In an embodiment, the first-person view may not include the avatar corresponding to the user, or may include a body part (e.g., the avatar's hand) of the avatar, an item worn by the avatar, or the back of the avatar. However, the VR content is not limited thereto, and for example, the VR content may include content capable of expressing a scene from a third person perspective. In an embodiment, the VR content may be provided as a VR game application or a VR video application is executed.

In an embodiment, the first object may be at least one object where a sound is generated (e.g., an object generating sound), among one or more objects present in the virtual space of VR content. For example, while the VR game application is executed, one or more objects may be present within a designated distance (or within the field of view of the avatar corresponding to the user) from the position of the avatar corresponding to the user in the virtual space of the VR content. The first object may be at least one object corresponding to (e.g., generating a sound) a sound output (or to be output) through the speaker 420 among the one or more objects.

In an embodiment, the first sound of the first object (hereinafter, referred to as a "first sound of the first object" or a "first sound") may be a sound corresponding to the first object (e.g., generated in the first object or corresponding to an event related to the first object generated in the VR content). For example, the first sound may be a sound generated by a virtual plane (or corresponding to an event related to the virtual plane) when the first object in the VR content is the virtual plane.

In an embodiment, the first sound may be a sound source configured to be output from the VR application. For example, the first sound may be a sound source pre-programmed to be output when an event related to the first object occurs when the VR application (or VR content) is created.

In an embodiment, the magnitude of the first sound of the first object may be related to the distance between the avatar corresponding to the user and the first object. For example, the magnitude of the first sound of the first object may be inversely proportional to the square of the distance between the avatar corresponding to the user and the first object. For example, the magnitude of the first sound of the first object may be pre-programmed to be inversely proportional to the square of the distance between the avatar corresponding to the user and the first object in the VR content.

In an embodiment, the processor 470 may identify the position of the first object.

In an embodiment, the position of the first object may be a position of the first object relative to the position of the avatar. The processor 470 may track positions of one or more objects present in the virtual space of the VR content and the position of the avatar while the VR content is provided. The processor 470 may identify the position of the first object (and/or the distance between the avatar and the first object) relative to the position of the avatar, based on the position of the avatar in the virtual space and the position of the first object among the positions of the one or more objects.

In an embodiment, the processor 470 may output the first sound of the first object through the speaker 420.

In operation 603, when the first object moves in the virtual space, the processor 470 may obtain a second sound corresponding to the movement of the first object, based on the first sound and the position of the first object.

In an embodiment, the processor 470 may obtain (e.g., generate) the second sound corresponding to the movement of the first object by rendering (e.g., sound rendering) the first sound based on the first sound and the position of the first object.

In an embodiment, the second sound corresponding to the movement of the first object (hereinafter, referred to as a "second sound corresponding to the movement of the first object" or a "second sound") may be a sound to be output through the speaker 420 at the time when the first object is positioned at the changed position when the position of the first object is changed in the virtual space.

In an embodiment, the second sound corresponding to the movement of the first object may correspond to the distance between the avatar corresponding to the user and the first object and/or the direction between the avatar and the first object.

In an embodiment, while the first object moves, the processor 470 may render the first sound such that the second sound has a magnitude inversely proportional to the square of the distance between the avatar corresponding to the user and the first object.

In an embodiment, the processor 470 may render (e.g., audio-process) the first sound such that the second sound indicates the direction between the avatar and the first object while the first object moves. For example, while the first object moves, the processor 470 may determine the direction from the position of the avatar to the position of the first object based on the position of the avatar and the position of the first object. The processor 470 may obtain (e.g., determine) the direction from the position of the avatar to the position of the first object as the direction between the avatar and the first object based on the direction in which the avatar faces (e.g., the direction in which the face (or gaze) of the avatar faces) (e.g., relative to the direction in which the face of the avatar faces). The processor 470 may obtain the second sound by rendering the first sound based on the determined direction between the avatar and the first object.

In an embodiment, the processor 470 may obtain a second sound (e.g., a three-dimensional second sound) corresponding to the movement of the first object by rendering the first sound using a channel audio-based method. For example, the processor 470 may identify a head related transfer function (HRTF) corresponding to the distance between the avatar corresponding to the user and the first object and the direction between the avatar and the first object. The processor 470 may generate the second sound to be output through the plurality of speakers 420 (e.g., the first speaker for providing the sound to the left ear of the user and the second speaker for providing the sound to the right ear of the user) by performing convolution on the head related transfer function corresponding to the direction between the avatar and the first object and the identified head related transfer function.

In an embodiment, the processor 470 may obtain the second sound (e.g., the three-dimensional second sound) corresponding to the movement of the first object by rendering the first sound using an object audio-based method. For example, the processor 470 may obtain an audio object (e.g., the distance between the avatar and the first object, the direction between the avatar and the first object, and the first sound). The processor 470 may generate the second sound to be output through the plurality of speakers 420 by convoluting the audio object and the head related transfer function.

In the above-described examples, it is exemplified that a three-dimensional (e.g., stereoscopic) second sound is obtained using a channel audio-based method or an object audio-based method, but the disclosure is not limited thereto. For example, the processor 470 may obtain a two-dimensional second sound based on the first sound and the position of the first object. For example, when the first object moves from the left position to the right position with respect to the position of the avatar in the virtual space, the processor 470 may obtain the second sound such that the second sound whose magnitude increases while the first object approaches the position of the avatar is output through the first speaker, and the second sound whose magnitude decreases while the first object moves away from the position of the avatar is output through the second speaker.

In operation 605, in an embodiment, the processor 470 may output the second sound through the speaker 420 while the first object moves.

In an embodiment, the processor 470 may output the second sound through the plurality of speakers while the first object moves, thereby providing the user with an immersive experience for the movement of the first object.

In operation 607, in an embodiment, the processor 470 may determine one or more vibration devices corresponding to the movement of the first object among the plurality of vibration devices. For example, the processor 470 may determine one or more vibration devices to output a vibration for indicating the movement of the first object, from among the plurality of vibration devices.

In an embodiment, the processor 470 may determine one or more vibration devices to output vibration among the plurality of vibration devices, based on the distance and direction between the avatar corresponding to the user and the first object. For example, the processor 470 may determine the distance between the avatar and the first object based on the position of the avatar and the position of the first object. The processor 470 may determine the direction from the position of the avatar to the position of the first object based on the position of the avatar and the position of the first object. The processor 470 may determine the direction from the determined position of the avatar to the position of the first object as the direction between the avatar and the first object, with respect to the direction in which the face (or gaze) of the avatar faces (e.g., relative to the direction in which the face of the avatar faces). The processor 470 may determine one or more vibration devices to output vibration among the plurality of vibration devices, based on the determined distance between the avatar and the first object and the direction between the avatar and the first object.

Hereinafter, an operation of determining one or more vibration devices corresponding to the movement of the first object among the plurality of vibration devices is described in more detail with reference to FIGS. 5 and 7.

Figure 7:
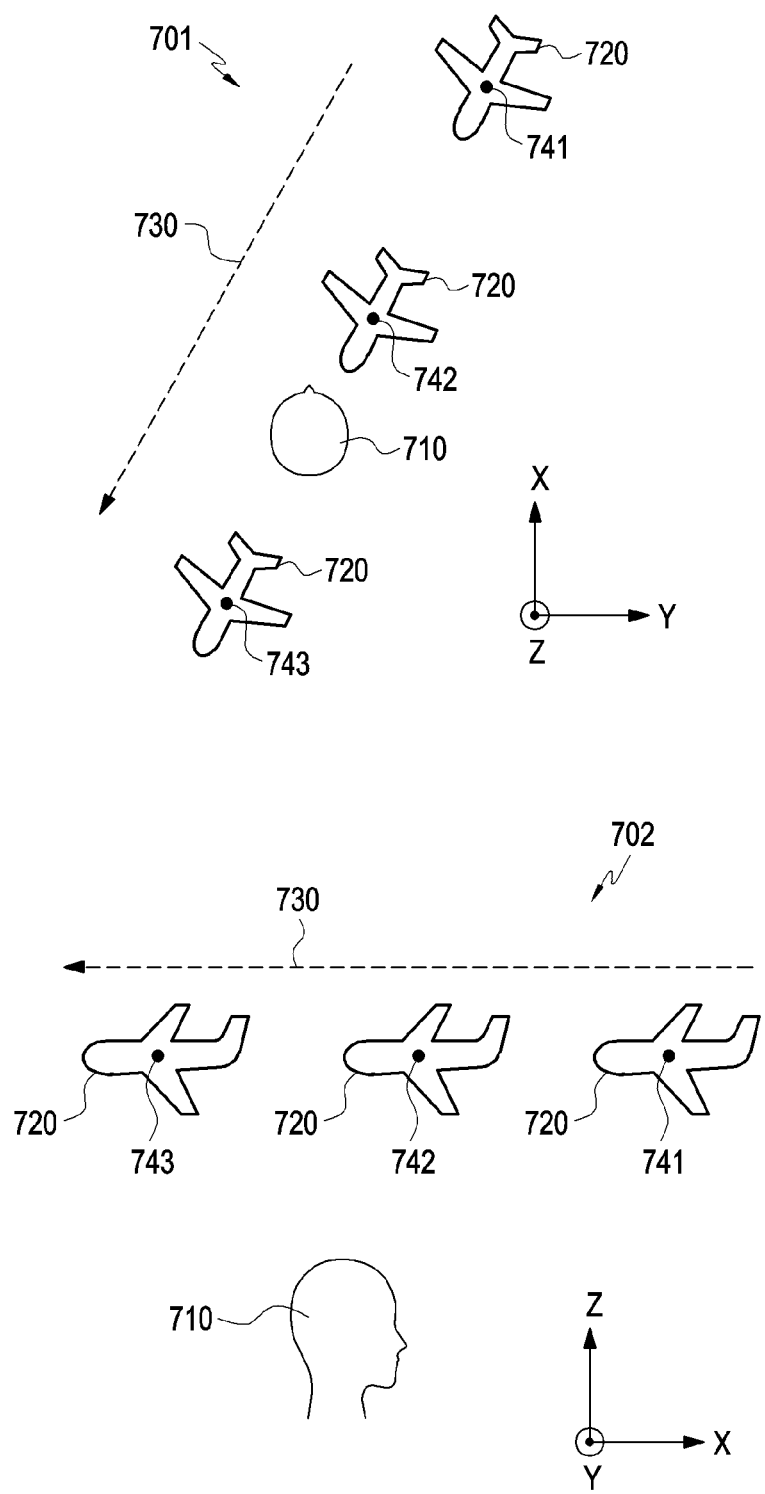
FIG. 7 is a view illustrating a method for providing a vibration corresponding to a movement of a first object according to an embodiment.

FIG. 7 is a view illustrating a method for providing a vibration corresponding to a movement of a first object according to an embodiment.

Referring to FIGS. 5 and 7, in an embodiment, FIG. 7 may be a view illustrating a first object moving relative to a position of an avatar in a virtual space of VR content.

In an embodiment, reference numeral 701 of FIG. 7 may be a plan view (e.g., a view toward the −Z axis) indicating the first object 720 (e.g., a virtual plane) moving relative to the position of the avatar 710 in the virtual space, and reference numeral 702 of FIG. 7 may be a side view (a view toward the −Y axis) indicating the first object 720 moving relative to the position of the avatar 710 in the virtual space. In reference numerals 701 and 702, the direction indicated by the arrow 730 may indicate a direction in which the first object 720 moves. As illustrated in reference numeral 701 and reference numeral 702, the first object 720 may move while being positioned in the order of a position 741, a position 742, and a position 743.

In an embodiment, the processor 470 may determine one or more vibration devices (and the number of one or more vibration devices) corresponding to the movement of the first object and intensities at which the one or more vibration devices vibrate, based on the distance and direction between the avatar 710 and the first object 720. Hereinafter, for convenience of description, it is assumed that the intensity at which the vibration device vibrates is determined to be any one of the intensity 4, the intensity 3, the intensity 2, and the intensity 1, and it is assumed that the intensity is in the order of the intensity 4, the intensity 3, the intensity 2, and the intensity 1 (e.g., it is assumed that the intensity 4 is the largest and the intensity 1 is the smallest among the intensity 4, the intensity 3, the intensity 2, and the intensity 1).

In an embodiment, when the first object 720 is positioned at the position 741, the processor 470 may determine the vibration device 541, the vibration device 531, and the vibration device 511 as devices to output vibration, based on the distance and direction between the avatar 710 and the first object 720. The processor 470 may determine the intensities of the vibration device 541, the vibration device 531, and the vibration device 511 to have intensity 1, intensity 1, and intensity 1, respectively.

In an embodiment, when the first object 720 is positioned at the position 742, the processor 470 may determine the vibration device 541, the vibration device 531, the vibration device 511, and the vibration device 512 as devices to output vibration, based on the distance and direction between the avatar 710 and the first object 720. The processor 470 may determine the intensities of the vibration device 541, the vibration device 531, the vibration device 511, and the vibration device 512 to have intensity 3, intensity 3, intensity 4, and intensity 2, respectively.

In an embodiment, when the first object 720 is positioned at the position 743, the processor 470 may determine the vibration device 523, the vibration device 522, and the vibration device 513 as devices to output vibration, based on the distance and direction between the avatar 710 and the first object 720. The processor 470 may determine the intensities of the vibration device 523, the vibration device 522, and the vibration device 513 to have intensity 2, intensity 2, and intensity 4, respectively.

However, the one or more vibration devices corresponding to the movement of the first object and the method for determining the vibration intensity of the one or more vibration devices are not limited to the examples described with reference to FIGS. 7 and 5.

In the above-described examples, the operation of providing the vibration corresponding to the movement of the first object when the first object moves has been described, but the disclosure is not limited thereto. For example, when the first sound is generated by the first object without movement of the first object, the processor 470 may provide the vibration corresponding to the direction between the avatar and the first object in the virtual space. Hereinafter, a method for providing a vibration corresponding to a position (or direction) of a first sound in a virtual space by the processor 470 is described with reference to FIGS. 5 and 8.

Figure 8:
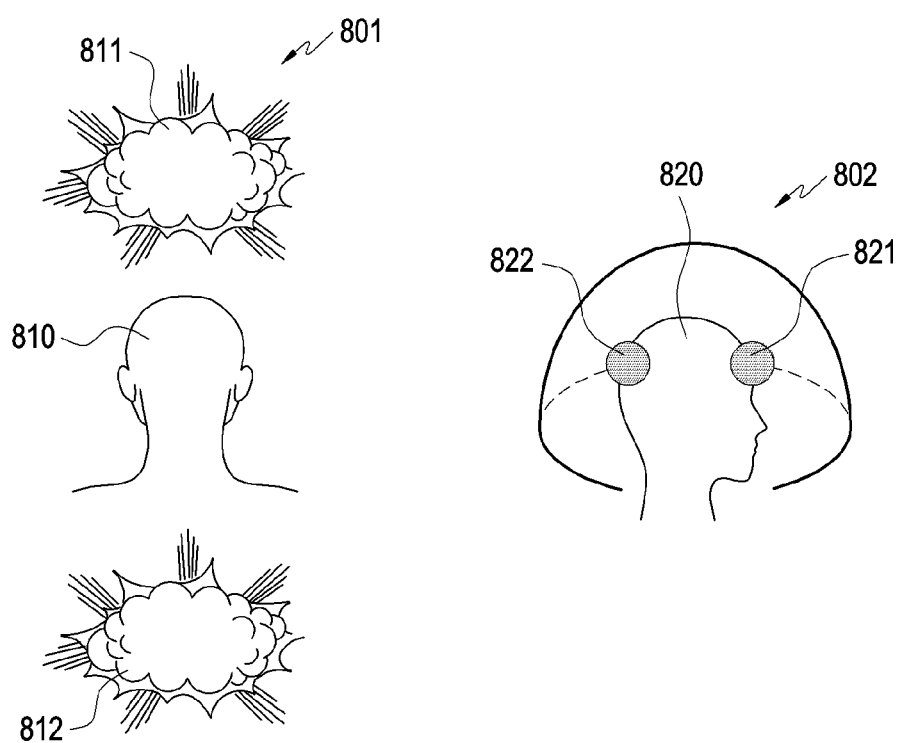
FIG. 8 is a view illustrating a method for providing a vibration corresponding to a position of a first sound according to an embodiment.

FIG. 8 is a view illustrating a method for providing a vibration corresponding to a position of a first sound according to an embodiment.

Referring to FIGS. 5 and 8, in an embodiment, the processor 470 may determine to output the vibration corresponding to the direction between the avatar and the first sound (and the direction between the avatar and the first object in which the first sound is generated).

In an embodiment, the processor 470 may identify the position of the first object (e.g., the position of the first object relative to the position of the avatar) where the first sound is generated.

In an embodiment, reference numeral 801 may indicate a first object 811 corresponding to a first sound generated in front of the avatar 810 and a first object 812 corresponding to a first sound generated behind the avatar 810, in a virtual space. Reference numeral 802 may indicate the position 821 of the vibration transferred to the user 820 when the first sound is generated in the first object 811 and the position 822 of the vibration transferred to the user 820 when the first sound is generated in the first object 812.

In an embodiment, when the first sound is generated by the first object 811 positioned in front of the avatar 810, the processor 470 may determine the vibration device 542, the vibration device 541, and the vibration device 543 as devices to output vibration in order to output vibration at the position 821 corresponding to the direction between the avatar 810 and the first object 811. The processor 470 may determine the intensities of the vibration device 542, the vibration device 541, and the vibration device 543 as intensity 3, intensity 3, and intensity 3, respectively, based on the distance between the avatar 810 and the first object 811.

In an embodiment, when the first sound is generated by the first object 812 positioned behind the avatar 810, the processor 470 may determine the vibration device 513, the vibration device 533, and the vibration device 523 as devices to output vibration in order to output vibration at the position 822 corresponding to the direction between the avatar 810 and the first object 812. The processor 470 may determine the intensities of the vibration device 513, the vibration device 533, and the vibration device 523 as intensity 3, intensity 3, and intensity 3, respectively, based on the distance between the avatar 810 and the first object 812.

However, the one or more vibration devices corresponding to the direction between the avatar and the first object (and the distance between the avatar and the first object) and the method for determining the vibration intensity of the one or more vibration devices are not limited to the examples described with reference to FIGS. 8 and 5.

In an embodiment, when the electronic device 401 includes only speakers disposed adjacent to both ears of the user when the electronic device 401 is worn on the user, such as the first speaker and the second speaker, it may be difficult for the electronic device 401 to output sound in such a manner that it is identified whether the position of the generated sound is the front or rear of the avatar when the sound is generated in front of (or behind) the avatar corresponding to the user in the virtual space. This phenomenon may be referred to as "front-back confusion". The electronic device 401 may provide vibration based on the direction between the avatar and the first object, thereby addressing front-back confusion.

Referring back to FIG. 6, in operation 609, in an embodiment, the processor 470 may control the vibration module 450 such that one or more vibration devices vibrate while the second sound is output. For example, while the second sound is output through the speaker 420 in operation 605, the processor 470 may control the vibration module 450 such that each of the one or more vibration devices determined in operation 607 vibrates at the intensities determined in operation 607.

FIG. 6 illustrates an example in which operations 603 and 605 are performed prior to operations 607 and 609, but the disclosure is not limited thereto. For example, the processor 470 may perform operations 607 and 609 prior to operations 603 and 605.

In an embodiment, when a plurality of sounds are generated in the virtual space and a plurality of objects respectively corresponding to the plurality of sounds are present, the processor 470 may determine at least one first object to perform the above-described operations 601 to 609 from among the plurality of objects. For example, the processor 470 may determine at least one object positioned within a designated distance from the position of the avatar corresponding to the user among the plurality of objects as the first object. For example, among the plurality of objects, at least one object positioned within the field of view of the avatar corresponding to the user may be determined as the first object. For example, the processor 470 may determine, as the first object, an object corresponding to a sound having the largest magnitude among the plurality of objects.

Figure 9:
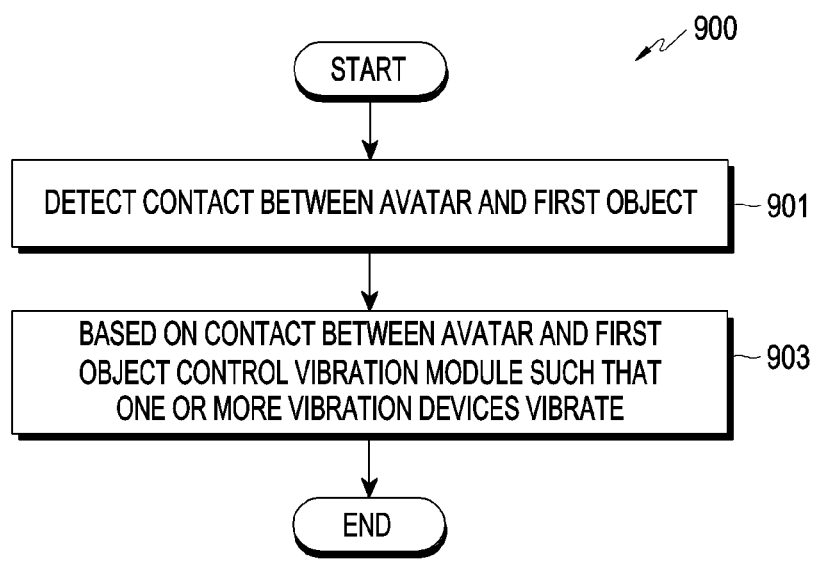
FIG. 9 is a flowchart illustrating a method for providing a vibration according to an embodiment.

FIG. 9 is a flowchart 900 illustrating a method for providing vibration according to an embodiment.

Figure 10:
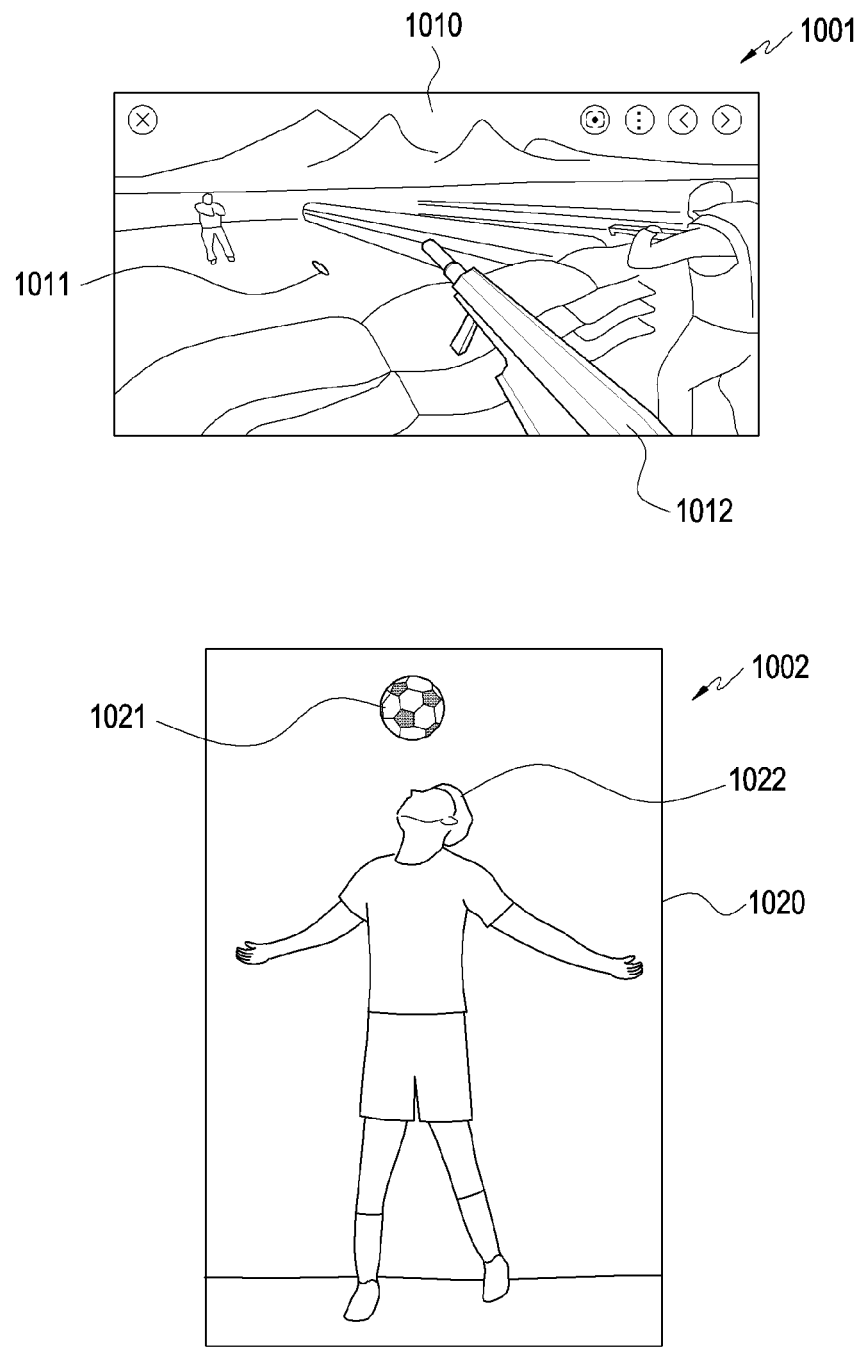
FIG. 10 is a view illustrating a method for providing a vibration according to an embodiment.

FIG. 10 is a view illustrating a method for providing a vibration according to an embodiment.

In an embodiment, FIGS. 9 and 10 are views illustrating an operation of providing a vibration corresponding to a contact (or collision) between an avatar corresponding to a user and a first object in a virtual space of VR content.

Referring to FIG. 9, in operation 901, in an embodiment, the processor 470 may detect a contact between an avatar and a first object in a virtual space of VR content.

In an embodiment, the processor 470 may identify (e.g., track) the position of the avatar (e.g., the coordinates of the avatar) and the position of the first object while the first object moves in the virtual space. When the position of the first object corresponds to the position of the avatar, the processor 470 may determine that the avatar and the first object contact each other. For example, when the position of the first object matches the position of the avatar, the processor 470 may determine that the avatar and the first object contact each other. For example, when each of the position of the first object and the position of the avatar is composed of a coordinate range, and when at least a portion of the coordinate range of the first object and at least a portion of the coordinate range of the avatar overlap each other, the processor 470 may determine that the avatar and the first object contact each other. However, the disclosure is not limited thereto. For example, when the distance between the first object and the avatar is within a designated distance, the processor 470 may determine that the avatar and the first object contact each other.

In operation 903, in an embodiment, the processor 470 may control the vibration module 450 such that one or more vibration devices among the plurality of vibration devices vibrate, based on the contact between the avatar and the first object.

In an embodiment, the processor 470 may determine one or more vibration devices corresponding to contact between the avatar and the first object among the plurality of vibration devices.

In an embodiment, the processor 470 may determine one or more vibration devices to output vibration among the plurality of vibration devices, based on the direction between the avatar and the first object when the avatar and the first object contact each other. For example, when the avatar and the first object contact each other, the processor 470 may identify the direction between the avatar and the first object (or the direction between the avatar and the first object immediately before the avatar and the first object contact each other). The processor 470 may determine, among the plurality of vibration devices, one or more vibration devices disposed at the position of the electronic device 401 corresponding to the direction between the avatar and the first object when the avatar and the first object contact each other, as one or more vibration devices to output vibration.

In an embodiment, the processor 470 may determine one or more vibration devices to output vibration among the plurality of vibration devices, based on the direction between the avatar and the first object when the avatar and the first object contact each other, the type of the first object, the size of the first object, and/or the contact area between the avatar and the first object.

However, the method for determining one or more vibration devices to output vibration among the plurality of vibration devices when the avatar and the first object contact each other is not limited to the above-described examples.

In an embodiment, the processor 470 may determine vibration patterns (e.g., vibration intensity and vibration time) of the one or more vibration devices, based on the speed at which the first object contacts the avatar (e.g., the moving speed of the first object when the avatar is stopped). For example, the processor 470 may control the vibration module 450 such that, when the first object comes into contact with the avatar at a second speed faster than a first speed as compared to when the first object comes into contact with the avatar at the first speed, the one or more vibration devices generate a vibration having a greater intensity for a longer time.

In an embodiment, the processor 470 may determine the vibration pattern based on the speed at which the first object comes into contact with the avatar, the type of the first object, the size of the first object, and/or the contact area between the avatar and the first object. However, the method for determining the vibration pattern when the avatar and the first object contact each other is not limited to the above-described examples.

In an embodiment, reference numeral 1001 of FIG. 10 may indicate a screen 1010 of a scene in which a virtual bullet 1011 flies toward an avatar in a virtual space while a VR first-person shooter (FPS) game is executed. In reference numeral 1001, reference numeral 1012 may indicate a virtual gun worn by an avatar. In an embodiment, reference numeral 1002 of FIG. 10 may indicate a scene 1020 in which an avatar 1022 (e.g., a virtual soccer player) corresponding to the user traps a virtual soccer ball 1021 using the head.

In an embodiment, the processor 470 may control the vibration module 450 to output a vibration having a greater intensity for a longer time when the virtual bullet 1011 having a higher movement speed than the movement speed of the virtual soccer ball 1021 and the avatar come into contact (e.g., collide) with each other in reference numeral 1001, as compared to when the avatar 1022 and the virtual soccer ball 1021 contact each other in reference numeral 1002.

In an embodiment, the processor 470 may determine a smaller number of vibration devices as vibration devices to output vibration when the virtual bullet 1011 having a smaller size than the size of the virtual soccer ball 1021 and the avatar contact each other in reference numeral 1001, as compared with when the avatar 1022 and the virtual soccer ball 1021 contact each other in reference numeral 1002.

In an embodiment, in FIGS. 6 to 10, a method for providing vibration when the electronic device 401 is VR glasses has been described, but when the electronic device 401 is AR glasses, the above-described examples may be applied in the same or similar manner. In this case, the above-described first object may be a virtual object related to an actual object viewed through AR glasses and corresponding to a sound. The processor 470 may apply the above-described operations according to the movement of the virtual object.

Figure 11:
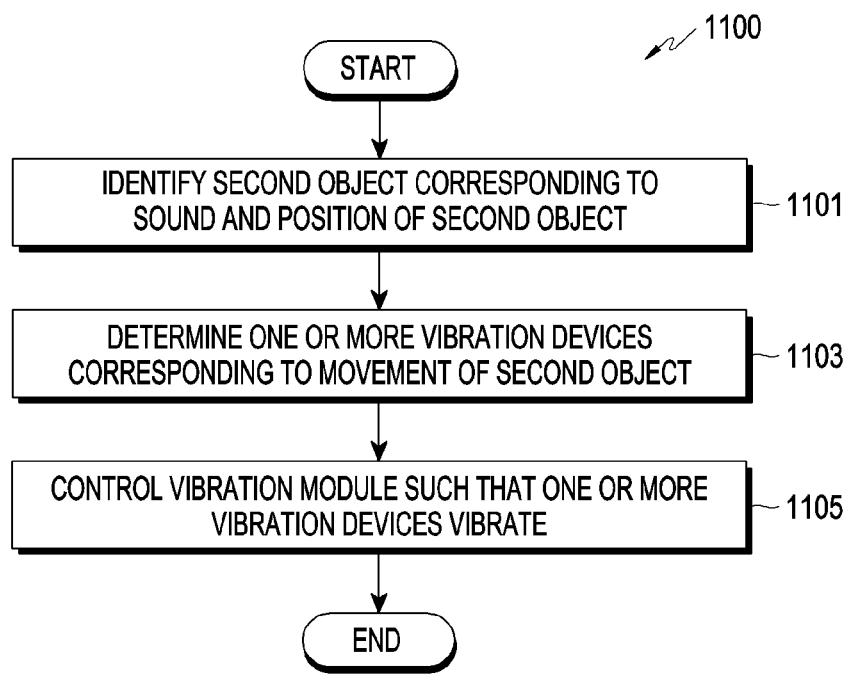
FIG. 11 is a flowchart illustrating a method for providing a vibration according to an embodiment.

FIG. 11 is a flowchart 1100 illustrating a method for providing vibration according to an embodiment.

Referring to FIG. 11, in operation 1101, in an embodiment, the processor 470 may identify the second object corresponding to the sound and the position of the second object.

In an embodiment, the second object may be at least one object in which a sound is generated (e.g., an object generating a sound), among one or more objects present in the real world (or a real space).

In an embodiment, the processor 470 may identify the second object and the position of the second object based on the sound obtained through the microphone 430 and/or the image obtained through the camera 440.

In an embodiment, the processor 470 may obtain the sound generated from the second object through the microphone 430. The processor 470 may identify the position (e.g., the position and/or direction of the second object relative to the position of the user) of the second object based on the obtained sound. For example, when the microphone 430 includes a plurality of microphones, the processor 470 may obtain, through the plurality of microphones, a sound introduced in a specific direction (e.g., a direction from the position of the second object to the position of the electronic device 401) using beam forming. The processor 470 may identify the position (e.g., the position and/or direction of the second object relative to the position of the user) of the second object based on the obtained sound.

In an embodiment, the processor 470 may obtain an image for the second object through the camera 440. For example, the processor 470 may identify the second object where sound is generated and the position of the second object (and a change in the position of the second object), based on the image of the second object.

In operation 1103, in an embodiment, the processor 470 may determine one or more vibration devices corresponding to the movement of the second object among the plurality of vibration devices. For example, the processor 470 may determine one or more vibration devices to output a vibration for indicating the movement of the second object among the plurality of vibration devices.

In an embodiment, the processor 470 may determine one or more vibration devices to output vibration among the plurality of vibration devices, based on the distance and direction between the user and the second object (e.g., the direction from the position of the user to the position of the second object with respect to the direction in which the user faces). For example, the processor 470 may determine the distance between the user and the second object based on the position of the user and the position of the second object. The processor 470 may determine the direction from the position of the user to the position of the second object based on the position of the user and the position of the second object. The processor 470 may determine a direction from the position of the user to the position of the second object (hereinafter, referred to as a "direction between the user and the second object") with respect to the direction in which the user's face (or gaze) faces (e.g., relative to the direction in which the user's face faces). The processor 470 may determine one or more vibration devices to output vibration among the plurality of vibration devices, based on the determined distance between the user and the second object and the direction between the user and the second object.

In an embodiment, the processor 470 may determine one or more vibration devices corresponding to the movement of the second object and intensities at which the one or more vibration devices vibrate, based on the distance and direction between the user and the second object.

In operation 1105, in an embodiment, the processor 470 may control the vibration module 450 such that one or more vibration devices vibrate. For example, the processor 470 may control the vibration module 450 such that each of the one or more vibration devices determined in operation 1103 vibrates at the intensity determined in operation 1103.

Figure 12:
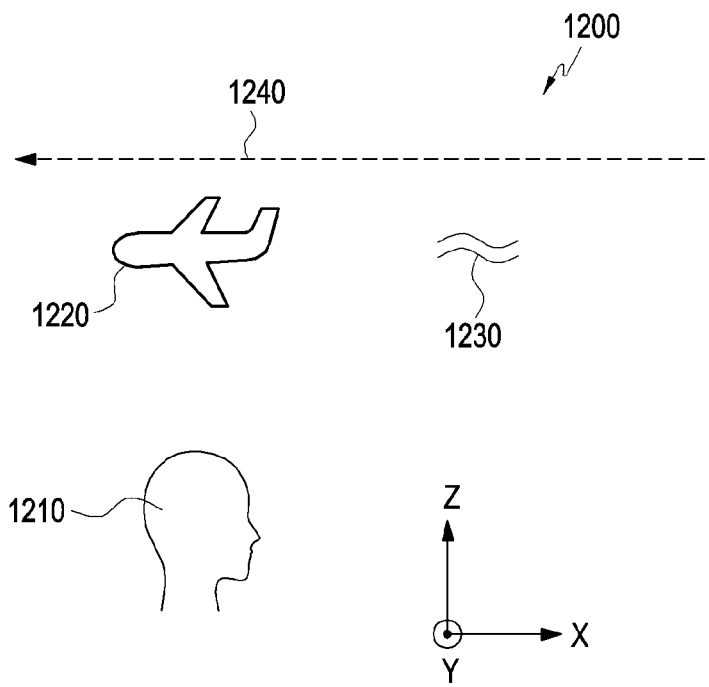
FIG. 12 is a view illustrating a method for providing a vibration according to an embodiment.

FIG. 12 is a view 1200 illustrating a method for providing vibration according to an embodiment.

Referring to FIG. 12, in an embodiment, as described above, the first object may be at least one object (e.g., generating a sound) corresponding to a sound output (or to be output) through the speaker 420, among one or more objects present within a designated distance (or within the field of view of the avatar corresponding to the user) with respect to the position of the avatar corresponding to the user in the virtual space of VR content.

In an embodiment, the first object (or the second object) may include an object (hereinafter, a "third object") generated by another object (e.g., a movement of another object). For example, the third object may include a virtual wind generated by a virtual plane (e.g., by the movement of the virtual plane).

In an embodiment, FIG. 12 may be a side view (e.g., a view toward the −Y-axis) illustrating an object 1220 (e.g., a virtual plane) moving relative to a position of an avatar 1210 in a virtual space. In FIG. 12, the direction indicated by the arrow 1240 may indicate a direction in which the object 1220 moves.

In an embodiment, when the object 1220 moves in the virtual space, the virtual wind 1230 may be generated as the third object by the movement of the object 1220. The generated virtual wind 1230 may move in substantially the same direction as the direction in which the object 1220 moves.

In an embodiment, the processor 470 may perform operations at least partially identical or similar to the operations described with reference to FIGS. 4 to 11 with respect to the third object. For example, the processor 470 may identify the third object and the position of the third object. The processor 470 may obtain a sound corresponding to the movement of the third object based on the sound of the third object and the position of the third object. The processor 470 may output the obtained sound through a plurality of speakers and control the vibration module 450 to allow one or more vibration devices to vibrate while the obtained sound is output.

Figure 13:
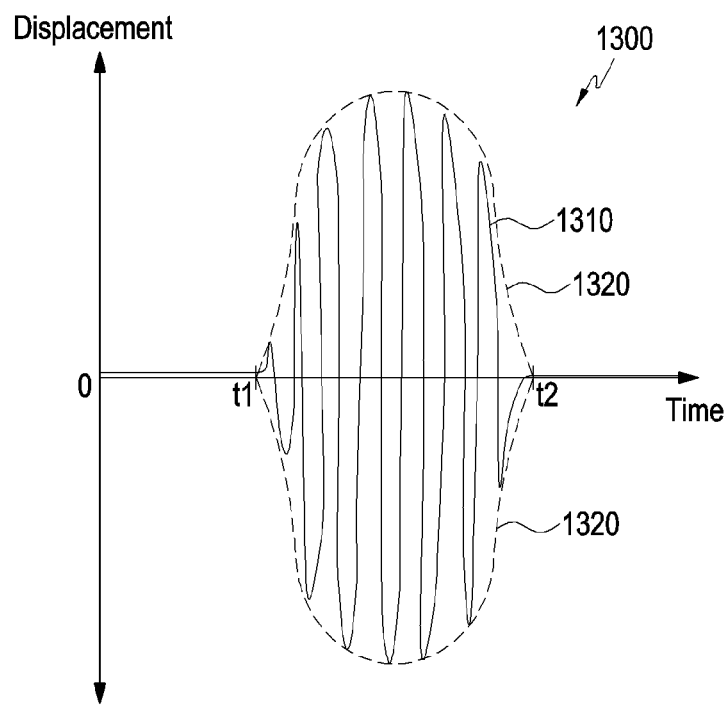
FIG. 13 is a view illustrating a method for providing a vibration according to an embodiment.

FIG. 13 is a view 1300 illustrating a method for providing vibration, according to an embodiment.

Referring to FIG. 13, in an embodiment, the processor 470 may control the vibration module 450 to provide the user with a vibration having different texture depending on the object. For example, when the object is a virtual plane, the processor 470 may control the vibration module 450 to provide a first type of vibration. When the object is a virtual wind, the processor 470 may control the vibration module 450 to provide a second type of vibration different from the first type.

In an embodiment, the processor 470 may control the vibration module 450 to provide a different type of vibration according to the type of the object, the size of the object, and/or the moving speed of the object.

In an embodiment, FIG. 13 may show a graph showing displacement of a weight included in each of a plurality of vibration devices included in the vibration module 450 over time. For example, FIG. 13 may be a graph illustrating displacement of a weight included in the vibration device 512 while the first object (e.g., a virtual plane) moves from the position 742 to the position 743 in FIG. 7.

In an embodiment, the weight may be linearly reciprocated by an interaction between the magnetic field and the magnet generated by the current flowing through the coil included in the vibration device, thereby generating vibration.

In an embodiment, in FIG. 13, line 1310 may denote the displacement in which the weight linearly reciprocates according to time t (e.g., a time when the first object (e.g., a virtual plane) moves from a position 742 to a position 743, or a time from t1 to t2). In FIG. 13, line 1320 may indicate the amplitude at which the weight linearly reciprocates.

In an embodiment, the processor 470 may differently control the frequency at which the weight linearly reciprocates (e.g., the frequency of the vibration device), the amplitude at which the weight linearly reciprocates, and/or the time when the weight vibrates (e.g., the time from t1 to t2) so that different types of vibrations are output according to the type of the object, the size of the object, and/or the moving speed of the object. In an embodiment, the processor 470 may control the vibration intensity of the vibration device by differently controlling the frequency at which the weight linearly reciprocates and the amplitude at which the weight linearly reciprocates.

FIG. 13 illustrates the vibration provided through one vibration device but, without limitations thereto, the processor 470 may perform the above-described operation on each of the plurality of vibration devices included in the vibration module 450.

Figure 14:
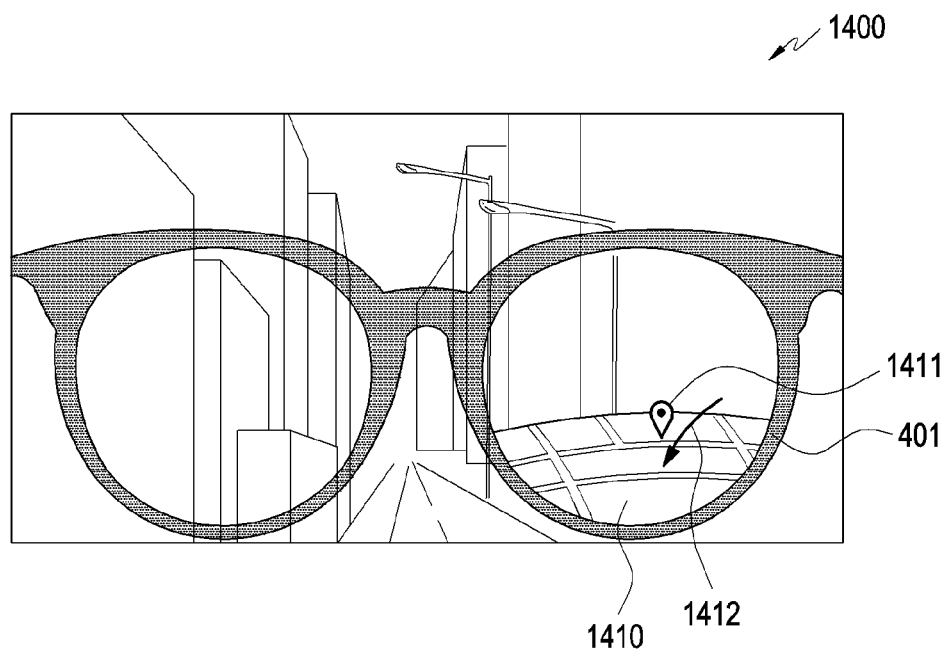
FIG. 14 is a view illustrating a method for providing a vibration according to an embodiment.

FIG. 14 is a view 1400 illustrating a method for providing vibration according to an embodiment.

Referring to FIG. 14, in an embodiment, the electronic device 401 (e.g., the processor 470) may display, on the display, the position and moving direction (or moving path) of the user on the virtual object while the user moves. For example, as illustrated in FIG. 14, the processor 470 may display a virtual map 1410 centered on the position of the user on the display (e.g., the light output module 211 of FIG. 2). The processor 470 may display the position 1411 of the user and the direction (or movement path) 1412 in which the user moves on the virtual map, on the display.

In an embodiment, the processor 470 may indicate the direction in which the user moves, using the vibration module 450. For example, the processor 470 may execute a navigation application. The processor 470 may set a destination in the navigation application. The processor 470 may output a vibration to guide the user to move to the position of the destination, based on the path from the current position of the user to the position of the destination. For example, the processor 470 may output a vibration corresponding to the direction in which the user has to move from the current position of the user through the vibration module 450. The processor 470 may control the vibration module 450 such that, among the plurality of vibration devices, one or more vibration devices disposed at the position corresponding to the direction in which the user has to move from the current position of the user (and the direction in which the user is currently facing) vibrate.

Figure 15:
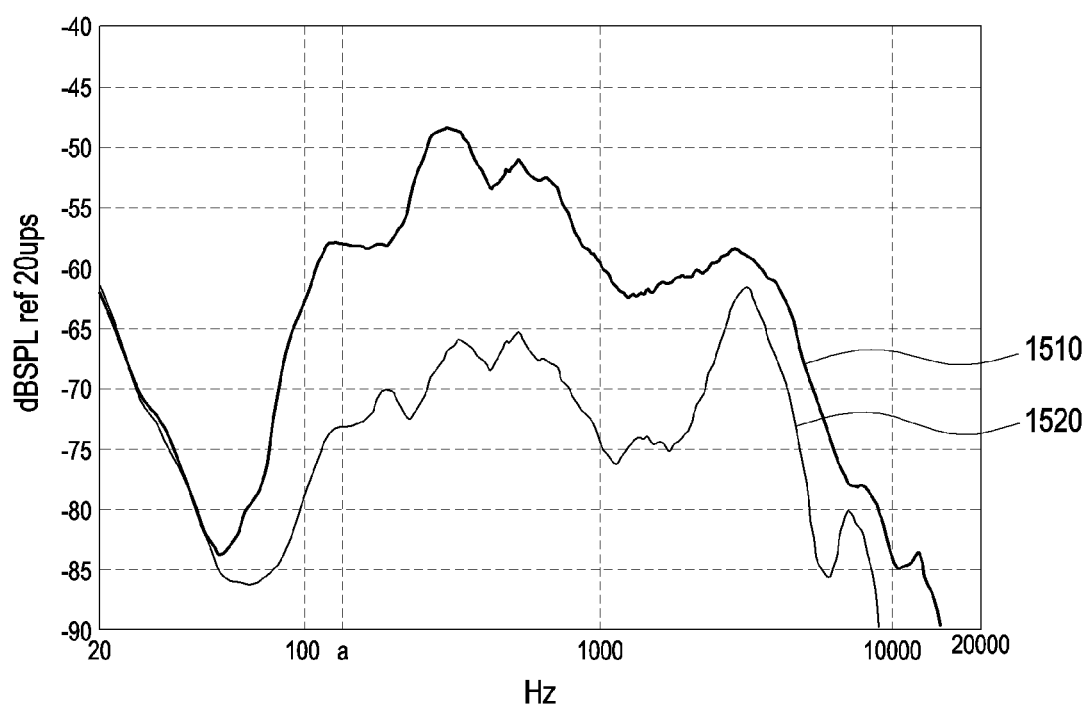
FIG. 15 is a view illustrating a method for providing a vibration according to an embodiment.

FIG. 15 is a view 1500 illustrating a method for providing vibration according to an embodiment.

Referring to FIG. 15, in an embodiment, the processor 470 may output a sound or a vibration according to a frequency range of a sound (e.g., a second sound) corresponding to an object.

In an embodiment, the speaker 420 may have different audio characteristics depending on frequency ranges. For example, FIG. 15 may show a graph 1510 of a sound pressure level according to a frequency of a first type speaker 420 and a graph 1520 of a sound pressure level according to a frequency of a second type speaker 420. As illustrated in the graph 1510 and the graph 1520 of FIG. 15, the sound pressure level may be lower in the frequency range less than or equal to frequency a than the frequency range exceeding frequency a.

In an embodiment, when the frequency range of the sound corresponding to the object falls within a frequency range (e.g., a frequency range less than or equal to frequency a in FIG. 15) having a low sound pressure level, the processor 470 may output a vibration to indicate movement of the object. When the frequency range of the sound corresponding to the object falls within a frequency range having a high sound pressure level (e.g., a frequency range exceeding frequency a in FIG. 15), the processor 470 may output a sound to indicate movement of the object.

A method for providing a vibration in a wearable electronic device 401 according to an embodiment may comprise identifying a first object corresponding to a first sound and a position of the first object in a virtual space of VR content displayed through a display 410 of the wearable electronic device 401. The method may comprise obtaining a second sound corresponding to a movement of the first object, based on the first sound and the position of the first object. The method may comprise outputting the second sound through a plurality of speakers of the wearable electronic device 401. The method may comprise determining one or more vibration devices corresponding to the movement of the first object from among a plurality of vibration devices included in a vibration module 450 of the wearable electronic device 401. The method may comprise controlling the vibration module 450 such that the one or more vibration devices vibrate while the second sound is output.

In an embodiment, the first sound may be a sound source pre-programmed to be output when an event related to the first object occurs in the VR content. The second sound may be obtained by performing sound rendering on the first sound.

In an embodiment, obtaining the second sound may include obtaining a distance between an avatar and the first object based on a position of the avatar and the position of the first object, obtaining a direction from the position of the avatar to the position of the first object with respect to a direction in which the avatar faces, as a direction between the avatar and the first object, and obtaining the second sound by rendering the first sound based on the distance and the direction between the avatar and the first object.

In an embodiment, determining the one or more vibration devices may include determining the one or more vibration devices to output a vibration among the plurality of vibration devices based on the distance and the direction between the avatar and the first object.

In an embodiment, determining the one or more vibration devices may further include determining respective vibration magnitudes of the one or more vibration devices based on the distance and the direction between the avatar and the first object.

In an embodiment, the method may further comprise detecting a contact between the avatar and the first object based on the first object and the position of the first object, and determining one or more vibration devices corresponding to a contact between the avatar and the first object among the plurality of vibration devices.

In an embodiment, determining the one or more vibration devices corresponding to the contact may include determining the one or more vibration devices to output a vibration among the plurality of vibration devices based on the direction between the avatar and the first object when the avatar and the first object contact each other.

In an embodiment, determining the one or more vibration devices corresponding to the contact may include determining vibration magnitudes of the one or more vibration devices based on a speed of the first object when the avatar and the first object contact each other, a type of the first object, a size of the first object, and/or a contact area between the avatar and the first object.

In an embodiment, the method may further comprise identifying the direction between the avatar and the first object, and determining the one or more vibration devices to output a vibration corresponding to the identified direction among the plurality of vibration devices.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device comprising:
a plurality of speakers;
a plurality of vibration devices configured to provide vibration;
a display;
at least one processor including processing circuitry; and
at least one memory storing one or more instructions that, when executed by the at least one processor individually or collectively, cause the wearable electronic device to:
identify a first object corresponding to a first sound and a position of the first object in a virtual space of virtual reality (VR) content displayed through the display,
obtain a direction from a position of an avatar to the position of the first object with respect to a direction in which the avatar faces, as a direction between the avatar and the first object,
obtain a second sound corresponding to a movement of the first object, based on the first sound and the position of the first object, wherein the second sound is obtained by rendering the first sound based on the direction between the avatar and the first object,
output the second sound through the plurality of speakers,
identify one or more vibration devices corresponding to the movement of the first object among the plurality of vibration devices, and
control the one or more vibration devices to vibrate while the second sound is output through the plurality of speakers.

2. The wearable electronic device of claim 1, wherein the first sound comprises a sound source pre-programmed to be output when an event related to the first object occurs in the VR content.

3. The wearable electronic device of claim 2, wherein the one or more instructions, when executed by the at least one processor individually or collectively. further cause the wearable electronic device to:
obtain a distance between the avatar and the first object based on the position of the avatar and the position of the first object; and
obtain the second sound by rendering the first sound based on the distance and the direction between the avatar and the first object.

4. The wearable electronic device of claim 3, wherein the one or more instructions, when executed by the at least one processor individually or collectively, further cause the wearable electronic device to identify the one or more vibration devices based on the distance and the direction between the avatar and the first object.

5. The wearable electronic device of claim 4, wherein the one or more instructions, when executed by the at least one processor individually or collectively, further cause the wearable electronic device to determine respective vibration magnitudes of the one or more vibration devices based on the distance and the direction between the avatar and the first object.

6. The wearable electronic device of claim 1, wherein the one or more instructions, when executed by the at least one processor individually or collectively, further cause the wearable electronic device to:
identify the one or more vibration devices based on the direction between the avatar and the first object.

7. A wearable electronic device comprising:
a plurality of speakers:
a plurality of vibration devices configured to provide vibration;
a display;
at least one processor including processing circuitry; and
at least one memory storing one or more instructions that, when executed by the at least one processor individually or collectively, cause the wearable electronic device to:
identify a first object corresponding to a first sound and a position of the first object in a virtual space of virtual reality (VR) content displayed through the display,
obtain a second sound corresponding to a movement of the first object, based on the first sound and the position of the first object,
output the second sound through the plurality of speakers, identify one or more vibration devices corresponding to the movement of the first object among the plurality of vibration devices, control the one or more vibration devices corresponding to the movement of the first object to vibrate while the second sound is output through the plurality of speakers, detect a contact between an avatar and the first object, based on the first object and the position of the first object, identify one or more vibration devices corresponding to the contact between the avatar and the first object among the plurality of vibration devices, and control the one or more vibration devices corresponding to the contact between the avatar and the first object to vibrate.

8. The wearable electronic device of claim 7, wherein the one or more instructions, when executed by the at least one processor individually or collectively, further cause the wearable electronic device to identify the one or more vibration devices corresponding to the contact between the avatar and the first object based on a direction between the avatar and the first object when the avatar and the first object contact each other.

9. The wearable electronic device of claim 7, wherein the one or more instructions, when executed by the at least one processor individually or collectively, further cause the wearable electronic device to determine vibration magnitudes of the one or more vibration devices corresponding to the contact between the avatar and the first object based on one or more of a speed of the first object when the avatar and the first object contact each other, a type of the first object, a size of the first object, or a contact area between the avatar and the first object.

10. A method for providing a vibration in a wearable electronic device, the method comprising:

identifying a first object corresponding to a first sound and a position of the first object in a virtual space of virtual reality (VR) content displayed through a display of the wearable electronic device;

obtaining a direction from a position of an avatar to the position of the first object with respect to a direction in which the avatar faces, as a direction between the avatar and the first object;

obtaining a second sound corresponding to a movement of the first object, based on the first sound and the position of the first object, by rendering the first sound based on the direction between the avatar and the first object;

outputting the second sound through a plurality of speakers of the wearable electronic device;

identifying one or more vibration devices corresponding to the movement of the first object from among a plurality of vibration devices of the wearable electronic device; and controlling the one or more vibration devices to vibrate while the second sound is output through the plurality of speakers.

11. The method of claim 10, wherein the first sound comprises a sound source pre-programmed to be output when an event related to the first object occurs in the VR content.

12. The method of claim 11, wherein the obtaining the second sound further comprises:

obtaining a distance between the avatar and the first object based on the position of the avatar and the position of the first object; and obtaining the second sound by rendering the first sound based on the distance and the direction between the avatar and the first object.

13. The method of claim 12, wherein the identifying the one or more vibration devices comprises identifying the one or more vibration devices based on the distance and the direction between the avatar and the first object.

14. The method of claim 13, further comprising:

determining respective vibration magnitudes of the one or more vibration devices based on the distance and the direction between the avatar and the first object.

15. The method of claim 10, further comprising:

identifying the one or more vibration devices based on the direction between the avatar and the first object.

16. A method for providing a vibration in a wearable electronic device, the method comprising:

identifying a first object corresponding to a first sound and a position of the first object in a virtual space of virtual reality (VR) content displayed through a display of the wearable electronic device:

obtaining a second sound corresponding to a movement of the first object, based on the first sound and the position of the first object:

outputting the second sound through a plurality of speakers of the wearable electronic device:

identifying one or more vibration devices corresponding to the movement of the first object from among a plurality of vibration devices of the wearable electronic device;

controlling one or more vibration module to vibrate while the second sound is output through the plurality of speakers;

detecting a contact between an avatar and the first object, based on the first object and the position of the first object;

identifying one or more vibration devices corresponding to the contact between the avatar and the first object among the plurality of vibration devices; and controlling the one or more vibration devices corresponding to the contact between the avatar and the first object to vibrate.

17. The method of claim 16, wherein the identifying the one or more vibration devices corresponding to the contact comprises identifying the one or more vibration devices corresponding to the contact based on a direction between the avatar and the first object when the avatar and the first object contact each other.

18. The method of claim 16, wherein the identifying the one or more vibration devices corresponding to the contact comprises determining vibration magnitudes of the one or more vibration devices based on one or more of a speed of the first object when the avatar and the first object contact each other, a type of the first object, a size of the first object, or a contact area between the avatar and the first object.

19. A wearable electronic device comprising:

a microphone a plurality of vibration devices;

at least one processor including processing circuitry; and at least one memory storing one or more instructions that, when executed by the at least one processor individually or collectively, cause the wearable electronic device to:

obtain a sound through the microphone, based on the sound, identify a first object present in a real space and identify a position of the first object in the real space, wherein the first object corresponds to the sound, based on the position of the first object and a position of a user wearing the wearable electronic device, obtain a distance and a direction between the user and the first object, the direction being a direction from the position of the user to the position of the first object with respect to a direction in which the user faces, based on the distance and the direction between the user and the first object, identify one or more vibration devices corresponding to a movement of the first object among the plurality of vibration devices, and control the one or more vibration devices corresponding to the movement of the first object to vibrate.

20. The wearable electronic device of claim 19, further comprising a camera, wherein the one or more instructions, when executed by the at least one processor individually or collectively, further cause the wearable electronic device to:

based on the sound and an image obtained through the camera, identify the first object and the position of the first object.

* * * * *